United States Patent
Mack-Crane et al.

(10) Patent No.: US 9,130,875 B2
(45) Date of Patent: *Sep. 8, 2015

(54) METHOD AND SYSTEM FOR MULTI-LAYER NETWORK ROUTING

(75) Inventors: T. Benjamin Mack-Crane, Downers Grove, IL (US); Jonathan B. Sadler, Naperville, IL (US); Susan W. Teller, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 257 days.

This patent is subject to a terminal disclaimer.

(21) Appl. No.: 13/355,756

(22) Filed: Jan. 23, 2012

(65) Prior Publication Data

US 2012/0124236 A1  May 17, 2012

Related U.S. Application Data

(63) Continuation of application No. 12/787,015, filed on May 25, 2010, now Pat. No. 8,125,891, which is a continuation of application No. 11/945,135, filed on Nov. 26, 2007, now Pat. No. 7,821,946, which is a
(Continued)

(51) Int. Cl.
*G01R 31/08* (2006.01)
*H04L 12/66* (2006.01)
(Continued)

(52) U.S. Cl.
CPC . *H04L 45/62* (2013.01); *H04J 3/14* (2013.01); *H04J 3/1611* (2013.01); *H04L 45/02* (2013.01);
(Continued)

(58) Field of Classification Search
None
See application file for complete search history.

(56) References Cited

U.S. PATENT DOCUMENTS

| | | | |
|---|---|---|---|
| 5,430,727 A | 7/1995 | Callon | |
| 5,854,899 A | 12/1998 | Callon et al. | |

(Continued)

FOREIGN PATENT DOCUMENTS

| | | |
|---|---|---|
| EP | 1 146 682 A3 | 10/2001 |
| EP | 1 152 631 A2 | 11/2001 |

(Continued)

OTHER PUBLICATIONS

Wayne D. Grover, et al., "Cycle-Oriented Distributed Preconfiguration: Ring-Like Speed with Mesh-Like Capacity for Self-Planning Network Restoration," *Proceedings of IEEE ICC '98*, pp. 537-543 (Jun. 7-11, 1998).

(Continued)

*Primary Examiner* — Samina Choudhry
(74) *Attorney, Agent, or Firm* — Hamilton, Brook, Smith & Reynolds, P.C.

(57) ABSTRACT

Each node of a telecommunications network determines a connection type attributes available for each signal type supported by the node. Each signal type represents a different connection routing layer within the telecommunications network. Adaptation costs involved in traversing from one connection routing layer to another connection routing layer in the node are calculated. The connection type attributes and adaptation costs are included in a link state advertisement broadcasted by each node in the telecommunications network. A route calculation is performed for a desired signal to determine a route through the telecommunications network for the signal. The route calculation takes into account the various connection type attributes, availability, and adaptation costs in determining the shortest route for the signal through the telecommunications network.

31 Claims, 6 Drawing Sheets

Related U.S. Application Data continuation of application No. 10/355,306, filed on Jan. 31, 2003, now Pat. No. 7,301,911.

(60) Provisional application No. 60/353,254, filed on Feb. 1, 2002.

(51) Int. Cl.
```
H04L 12/28      (2006.01)
H04L 12/721     (2013.01)
H04J 3/14       (2006.01)
H04J 3/16       (2006.01)
H04L 12/751     (2013.01)
H04L 12/723     (2013.01)
H04L 12/715     (2013.01)
```

(52) U.S. Cl.
CPC .............. *H04L 45/123* (2013.01); *H04L 45/32* (2013.01); *H04L 45/50* (2013.01); *H04L 45/64* (2013.01); *H04J 2203/0053* (2013.01)

(56) References Cited

U.S. PATENT DOCUMENTS

| | | | |
|---|---|---|---|
| 5,995,503 | A | 11/1999 | Crawley et al. |
| 6,222,843 | B1* | 4/2001 | Mauger .................. 370/397 |
| 6,223,219 | B1 | 4/2001 | Uniacke et al. |
| 6,363,319 | B1 | 3/2002 | Hsu |
| 6,584,071 | B1* | 6/2003 | Kodialam et al. ............. 370/238 |
| 6,594,268 | B1 | 7/2003 | Aukia et al. |
| 6,614,785 | B1 | 9/2003 | Huai et al. |
| 6,985,959 | B1 | 1/2006 | Lee |
| 6,990,517 | B1 | 1/2006 | Bevan et al. |
| 7,161,910 | B2 | 1/2007 | Maeno |
| 7,301,911 | B2 | 11/2007 | Mack-Crane et al. |
| 7,313,328 | B2 | 12/2007 | Oki et al. |
| 7,545,829 | B2 | 6/2009 | Shimazaki et al. |
| 7,617,302 | B1 | 11/2009 | Uniacke et al. |
| 7,821,946 | B2 | 10/2010 | Mack-Crane et al. |
| 7,889,675 | B2 | 2/2011 | Mack-Crane et al. |
| 7,983,182 | B2 | 7/2011 | Sadler et al. |
| 8,125,891 | B2 | 2/2012 | Mack-Crane et al. |
| 2001/0033548 | A1 | 10/2001 | Saleh et al. |
| 2002/0085498 | A1 | 7/2002 | Nakamichi et al. |
| 2003/0070144 | A1* | 4/2003 | Schnelle et al. ............. 715/513 |
| 2004/0081105 | A1 | 4/2004 | Shimazaki et al. |
| 2008/0183890 | A1 | 7/2008 | Sadler et al. |
| 2011/0044348 | A1 | 2/2011 | Kini et al. |

FOREIGN PATENT DOCUMENTS

| | | |
|---|---|---|
| WO | WO 03/067835 | 8/2003 |
| WO | WO 2006/104795 | 10/2006 |
| WO | WO 2007/106102 | 9/2007 |
| WO | WO 2008/131076 A1 | 10/2008 |

OTHER PUBLICATIONS

J.W. Suurballe, et al., "A Quick Method for Finding Shortest Pairs of Disjoint Paths," *Networks*, vol. 14, pp. 325-336 (1984).

Ramesh Bhandari, et al., "High Level Requirements for Optical Shared Mesh Restoration," Internet Engineering Task Force, 5 unnumbered pages (Nov. 2000).

Wayne D. Grover, et al., "Cycle-Oriented Distributed Preconfiguration: Ring-Like Speed with Mesh-Like Capacity for Self-Organizing Proactive Network Restoration," *Proceedings of IEEE ICC '98*, 9 presentation slides (Jun. 7-11, 1998).

Mack-Crane, et al., "Enhancements to GMPLS Signaling for Optical Technologies," AlterNIC—Network Information Center, http://www.alternic.org/drafts/drafts-m-n/draft-mack-crane-gmpls-signaling-enhancements, pp. 1-15 (Nov. 2000).

Kompella, et al., "OSPF Extensions in Support of Generalized MPLS," AlterNIC—Network Information Center, http://www.alternic.org/drafts/drafts-kl-/draft-kompella-ospf-gmpls-extensions-00.html (Nov. 2000).

Mannie, et al., "Extensions to OSPF and IS-IS in support of MPLS for SDH/SONET Control," AlterNIC—Network Information Center, pp. 1-25 (Jul. 2000).

Papadimitriou, et al., "Generalized MPLS Architecture for Multi-Region Networks," http://www.ietf.org/internet-drafts/draft-vigoureux-shiomoto-ccamp-gmpls-mrn-00.txt., pp. 1-28 (Oct. 2002).

Bernstein, "Interdomain Optical Routing," *Journal of Optical Networking*, vol. 1, No. 2, pp. 80-92 (Feb. 2002).

Bernstein, "Framework for MPLS-Based Control of Optical SDH/ONET Networks," *IEEE Network*, pp. 20-26 (Jul./Aug. 2001).

"Information Technology—Telecommunications and Information Exchange Between Systems—Intermediate System to Intermediate System Intra-Domain Routing Information Exchange Protocol for Use in Connection with the Protocol for Providing the Connectionless-Mode Network Service (ISO)," Reference No. ISO/IEC 10589:1992(E), International Standard, cover page and pp. 122-125 (Jun. 15, 1992).

"Private Network-Network Interface Specification Version 1.0," (PNNT1.0), af-pnni-0055.000, The ATM Forum Technical Committee (Mar. 1996).

Coltun, "The OSPF Opaque LSA Option," Network Working Group, http://www.ietf.org/rfc.rfc2370.txt?number=237 (Jul. 1998).

Katz, "Traffic Engineering Extensions to OSPF," Network Working Group, http://www.watersprings.org/links/mlr/id/draft-katz-ospf-traffic 06.1 (Oct. 2001).

Li, et al., "IS-IS Extensions for Traffic Engineering," Network Working Group, http://search.ietf.org/internet-drafts/draft-ietf-isis-traffice 0.4 (Aug. 2001).

Kompella, et al., "Routing Extension in Support of Generalized MPLS," Network Working Group, http://search.ietf.org/internet-drafts/draft-ietf-ccamp-gmpls-routing01 (Nov. 2001).

Kompella, et al. "OSPF Extensions in Support of Generalized MPLS," CCAMP Working Group, http://search.ietf.org/internet-drafts/draft-ietf-ccamp-ospf-gmpls-extensions03 (Jan. 2002).

Kompella, et al. "IS-IS Extensions in Support of Generalized MPLS," Network Working Group, http://search.ietf.org/internet-drafts/draft-ietf-isis-ospf-gmpls-extensions07 (Jan. 2002).

Kompella, et al. "LSP Hierarchy with MPLS TE," Network Working Group, http://search.ietf.org/internet-drafts/draft-ietf.mpls-ospf-lsp-heirarchy-03 (May 2001).

Kompella, et al. "Link Bundling in MPLS Traffic Engineering," http://search.ietf.org/internet-drafts/draft-ietf-mpls-bundle-01 (Nov. 2001).

Communication Pursuant to Article 96(2) EPC dated May 22, 2007 for Application No. 037375771.1-1249, Reference No. JL4475.

Notification of Transmittal of the International Search Report and the Written Opinion of the International Searching Authority for Application No. PCT/US2008/060590, dated Jul. 25, 2008.

Architecture for the Automatic Switched Optical Networks (ASON), ISU-T Draft Study Period 2005-2008. International Telecommunication Union, Geneva, CH, No. G.8080/Y.1304 (Jun. 6, 2006).

"ASON Routing Architecture and Requirements for link State Protocols," ITU-T Standard in Force (I), International Telecommunication Union, Geneva, CH, No. G7715.1/Y.1760.1 (Feb. 22, 2004).

"Generalized Automatic Discovery Techniques," ITU-T Standard in Force (I), International Telecommunication Union, Geneva, CH, No. G7714/y.1705 (Aug. 22, 2005).

Mannie et al., "GMPLS Extensions to OSPF and IS-IS for SONET/SDH Network Controk," CCAMP Working Group, pp. 1-15 (Jun. 2002).

International Search Report for PCT/US2003/02927, date of mailing Jun. 12, 2003.

International Search Report and the Written Opinion of the International Searching Authority for PCT/US2006/015894, date of mailing Jan. 12, 2007.

International Preliminary Report on Patentability for PCT/US2006/015894, date of issue of report Sep. 16, 2008.

Communication Pursuant to Article 94(3) EPC dated Sep. 25, 2009 for Application No. 03 737 577.1.

International Preliminary Report on Patentability for PCT/US2008/060590, date of mailing Oct. 29, 2009.

(56) References Cited

OTHER PUBLICATIONS

Office Action from U.S. Appl. No. 11/787,698; Mail Date: Oct. 28, 2010.
Partial European Search Report in EP Application No. 10185054.3, 8 pages, Apr. 18, 2011.
Wilson, B.J., and Doverspike, R.D. "A Network Control Architecture for Bandwidth Management," *IEEE, ICC*, 1385-1391 (1992).
Dalioia, C., Lucent Technologies, "Draft Revision of G.7712/Y.1703 (ex.G.dcn), Version 1.1," ITU-Telecommunications Standardization Sector Temporary Document 066(PLEN) Study Group 15, International Telecommunication Union, Geneva, CH, pp. 76, Oct. 15-26, 2001.
Extended European Search Report in EP Application No. 10185054.3, 12 pages, no new references, Aug. 3, 2011.
Amendment After Final Rejection Under 37 CFR § 1.116 from U.S. Appl. No. 12/787,015 (now U.S. Patent 8,125,891); Mail Date: Nov. 30, 2011.
Office Action from U.S. Appl. No. 12/787,015 (now U.S. Patent 8,125,891); Mail Date: Sep. 22, 2011.
Amendment from U.S. Appl. No. 12/787,015 (now U.S. Patent 8,125,891); Dated: Jul. 5, 2011.
Office Action from U.S. Appl. No. 12/787,015 (now U.S. Patent 8,125,891); Mail Date: Mar. 3, 2011.

\* cited by examiner

| 0 1 2 3 4 5 6 7 8 9 10 11 12 13 14 15 16 17 18 19 20 21 22 23 24 25 26 27 28 29 30 31 |
|---|
| UNRESERVED BANDWIDTH |
| MAX LSP BANDWIDTH |

*FIG. 4A*

| 0 1 2 3 4 5 6 7 8 9 10 11 12 13 14 15 16 17 18 19 20 21 22 23 24 25 26 27 28 29 30 31 | | |
|---|---|---|
| SIGNAL TYPE | CONN. TYPES | AVAILABILITY |
| TRANSIT COST ||| 
| NUMBER OF SERVER TYPES || NUMBER OF CLIENT TYPES |
| SERVER SIGNAL TYPE || ADAPTATION COST |
| ⋮ |||
| CLIENT SIGNAL TYPE || ADAPTATION COST |
| ⋮ |||
| SERVER ENDPOINT AFFINITY |||
| ⋮ |||

*FIG. 4B*

| 0 1 2 3 4 5 6 7 8 9 10 11 12 13 14 15 16 17 18 19 20 21 22 23 24 25 26 27 28 29 30 31 |
|---|
| RESOURCE CLASS COLOR |

| 0 1 2 3 4 5 6 7 8 9 10 11 12 13 14 15 16 17 18 19 20 21 22 23 24 25 26 27 28 29 30 31 | |
|---|---|
| LINK PROT. TYPE | RESERVED |

| 0 1 2 3 4 5 6 7 8 9 10 11 12 13 14 15 16 17 18 19 20 21 22 23 24 25 26 27 28 29 30 31 |
|---|
| SHARED RISK LINK GROUP |
| ⋮ |
| SHARED RISK LINK GROUP |

*FIG. 4C*

METHOD AND SYSTEM FOR MULTI-LAYER NETWORK ROUTING

RELATED APPLICATIONS

This application is a continuation of U.S. application Ser. No. 12/787,015, filed May 25, 2010 now U.S. Pat. No. 8,125,891, which is a continuation of U.S. application Ser. No. 11/945,135, filed Nov. 26, 2007, now U.S. Pat. No. 7,821,946, which is a continuation of U.S. application Ser. No. 10/355,306, filed Jan. 31, 2003, now U.S. Pat. No. 7,301,911, which claims the benefit of 60/353,254, filed Feb. 1, 2002.

The entire teachings of the above applications are incorporated herein by reference.

TECHNICAL FIELD OF THE INVENTION

The present invention relates in general to telecommunications network control processing and more particularly to a method and system for multi-layer network routing.

BACKGROUND OF THE INVENTION

Calculation of a route through a network is based on link attributes advertised by each node in the network. There are several known link attributes that may be advertised by nodes 12 within telecommunications network 10. These link attributes include traffic engineering metric, maximum or total reservable bandwidth, unreserved bandwidth, resource class/color, link protection type, and shared risk link group. The traffic engineering metric specifies the link metric for traffic engineering purposes. The maximum or total reservable bandwidth specifies the maximum bandwidth that may be reserved on this link in one direction. Unreserved bandwidth specifies the amount of bandwidth not yet reserved on the link in the one direction. Resource class/color specifies administrative group membership for this link. The link protection type specifies the protection capability that exists for the link. The shared risk link group attribute identifies a set of links that share a resource whose failure may affect all links in the set.

The link state advertisement may also include an Interface Switching Capability Descriptor. The Interface Switching Capability Descriptor describes the switching capability for an interface where the link is defined as being connected to a node by an interface. For example, an interface that connects a given link to a node may not be able to switch individual packets but it may be able to switch channels within a Synchronous Optical Network (SONET) payload. Interfaces at each end of a link may not have the same switching capabilities. For bi-directional links, the switching capabilities of the link are defined to be the same in either direction for data entering and leaving the node through that interface. For a unidirectional link, it is assumed that the Interface Switching Capability Descriptor at the far end of the link is the same as at the near end of the link. A unidirectional link is required to have the same interface switching capabilities at both ends of the link.

The Interface Switching Capability Descriptor may specify a switching capability, an encoding type, a maximum and minimum labeled switch path (LSP) bandwidth, and interface maximum transmission unit. The switching capability descriptor specifies whether the interface is layer 2, packet, time division multiplex, lambda, or fiber capable as well as whether the interface supports more than one of these types. Maximum LSP bandwidth specifies the smaller of the unreserved bandwidth and the maximum reservable bandwidth per priority. Minimum LSP bandwidth specifies the minimum amount of bandwidth that may be reserved. The interface maximum transmission unit descriptor defines the maximum size of a packet that can be transmitted on this interface without being fragmented. Descriptors other than the switching capability descriptor are dependent on the type of switching capability defined in the switching capability descriptor.

The link attributes and interface switching capability descriptor discussed above are advertised by a node for its own egress interface only and require route calculations to find the reverse advertisement for a bi-directional link in order to determine the capabilities of a neighbor's end of the link. This unnecessarily complicates route calculation and adds the limitation that unidirectional links must have the same capabilities at both ends.

SUMMARY OF THE INVENTION

From the foregoing, it may be appreciated by those skilled in the art that a need has arisen for a technique to provide link state advertisements in a telecommunications network in order to facilitate multi-layer routing. In accordance with the present invention, a method and system for multi-layer network routing are provided that substantially eliminate or greatly reduce disadvantages and problems associated with conventional route calculation techniques.

According to an embodiment of the present invention, there is provided a method for multi-layer network routing that includes determining signal types implemented at each node of a network. Each signal type indicates a connection routing layer in the network. Connection types for each signal type and connection routing layer of each node of a network are determined for each link of each node. An availability of each connection type is also determined. The signal types, connection types, and availability are broadcast from each node to each neighboring node in the network. Using this broadcasted information, a route through the connection routing layers of the network may be determined for each signal sent in the network.

The present invention provides various technical advantages over conventional data management techniques. Some of these technical advantages are shown and described in the description of the present invention. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 4A-C illustrate an example link state advertisement generated at each node;

DETAILED DESCRIPTION OF THE INVENTION

Figure 1:
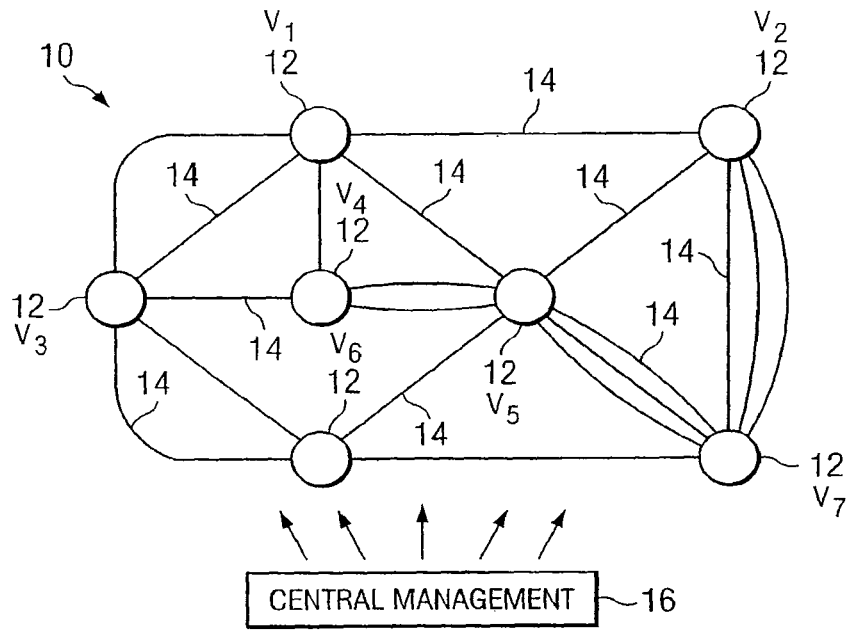
FIG. 1 illustrates a simplified diagram of a telecommunications network.

FIG. 1 is a simplified diagram of a telecommunications network 10.

Telecommunications network 10 includes a plurality of switching points or nodes 12 interconnected by links 14. Each node 12 is operable to transfer telecommunications signals using one or more signal types. Examples of signal types include Digital Service Level 1 (DS1), DS3, Virtual Tributary Level 1.5 (VT1.5), Synchronous Transport Signal Level 1 (STS-1), STS-3c, and Optical Carrier Level 3 (OC-3). Nodes 12 may also support other conventional signal types readily known by those skilled in the art. Each signal type represents a different connection routing layer within telecommunications network 10. For each signal carried within telecommunications network 10, a route to its intended destination is determined. Determination of the route through telecommunications network 10 may be made at an originating node 12, a node 12 acting as a supervisory or control node, or at a centralized management node 16 according to a desired design for telecommunications network 10. Determination of a route and generation of related information associated with nodes 12 of telecommunications network 10 may be performed by appropriate processing modules.

To automatically provision a signal through telecommunications network 10, a route is calculated and a connection setup is derived from the calculated route for informing nodes 12. The route identifies the switching equipment at nodes 12 and the appropriate links 14 that the signal traverses in order to reach a destination node 12 from an originating node 12. Once the route has been calculated, signaling of the connection setup to the appropriate nodes 12 in telecommunications network 10 is performed in order to establish the intermediate switching connections necessary to provide end to end service for the signal. Alternatively, the connections can be configured from a central source or by other means according to desired implementations. Signaling for the connection setup is performed by standard techniques known by those skilled in the art.

Figure 2:
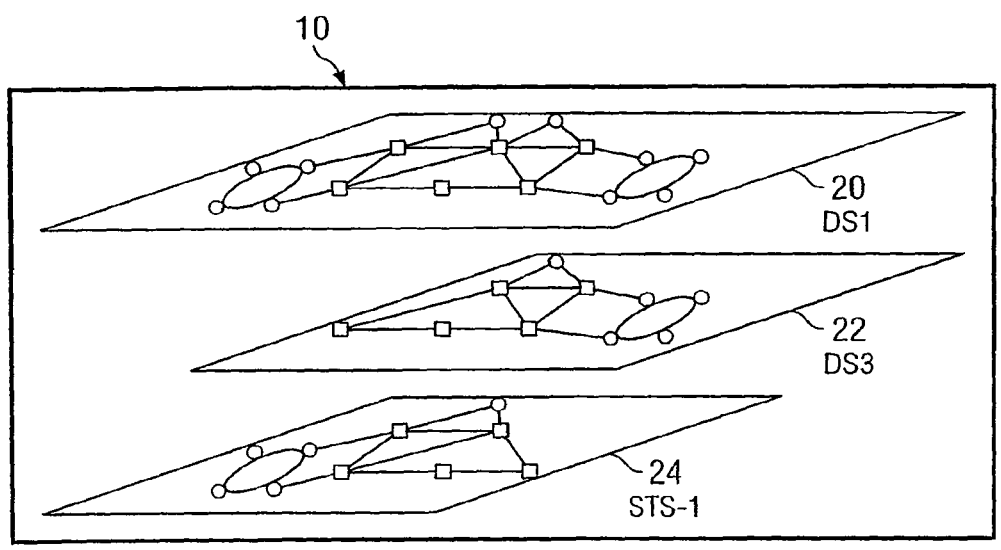
FIG. 2 illustrates a simplified diagram of a multiple connection routing layer configuration of the telecommunications network.

FIG. 2 shows an example layered view of telecommunications network 10. Routing of transport network signals over telecommunications network 10 may be accomplished by layer isolated connection routing or multi-layer connection routing. A layer is an abstraction containing the switching points and links that operate within one signal type. For the example shown in FIG. 2, layer 20 is associated with the DS1 signal type, layer 22 is associated with the DS3 signal type, and layer 24 is associated with the STS-1 signal type. A client layer is considered to be the originally requested network layer and a server layer provides a trunk capability for the client layer. Other layers may also be present within telecommunications network 10 with one layer being present for each signal type supported by telecommunications network 10.

Layer isolated connection routing provides for a separate routing instance to exist for each layer supported by telecommunications network 10. These routing instances operate independently of each other. Thus, each layer is unaware of the potential connectivity available within the other layers. By not knowing the connectivity available within other layers, the client layer is not able to optimally determine a point to request a server layer connection between two points in the client layer. In this manner, the client layer may pick non-optimal points for requesting a server layer connection in order to complete the route at the client layer. Moreover, the paths available at the server layer may not meet certain service requirements. If the client layer is unable to identify the characteristics of an available server layer connectivity in advance of making the request for a trunk connection, the client layer must wait for the route calculation to complete before determining whether the service requirements can be met. If the service requirements cannot be met, the client layer will need to reconsider the route it has taken and attempt to find another route that allows the service requirements to be met. Though the server layer may provide a list of connection possibilities with their respective attributes to the client layer, developing a list of paths and attributes at the client layer for each destination within the server layer would be processor and memory intensive when a network has a high number of paths between endpoints in the server layer and each path could have a different set of attributes. The present invention provides an embodiment to effectively use layer isolated connection routing in a multi-layer connection routing environment.

Multi-layer routing provides for a single routing instance to be responsible for connection routing within multiple layers of telecommunications network 10. This routing instance is able to view the status and attributes of all links within multiple layers and allows for better routes to be determined with fewer processor cycles and less memory. Conventional link advertisement is insufficient to support route calculation involving adaptation to mapped and multiplexed server layers and does not allow for different costs to be assigned to link connections at different network layers on the same advertised link. There is typically not sufficient information to determine acceptable routes in multi-layer networks unless all boundary nodes are capable of switching at all network layers, which may not be possible in a network design. Also, current routing practices do not support routing through pooled resources for adaptation and/or interworking functions and do not address all types of routing constraints that are necessary for effective route calculation in multi-layer networks. The present invention provides an embodiment that turns these disadvantages into advantages for effectively providing multi-layer routing.

Routes are calculated through the use of an algorithm. A common algorithm used in the calculation of a route through a network is known as Dijkstra's algorithm. Dijkstra's algorithm is a standard subroutine for finding shortest paths from an originating node to a destination node taking into account different weights or costs involved in traversing through the network. A variation of Dijkstra's algorithm, referred to as extended Dijkstra's algorithm or Constrained Shortest Path First (CSPF) algorithm, takes into account a link's attributes, availability guarantees, and economic cost to use to determine if the link can satisfy the routing constraints provided in a routing request to a specified destination node. In this manner, geographic diversity of a signal may be provided, economic cost for a connection may be minimized, or other desirable routing behaviors may be produced. In order to perform multi-layer network routing, each node determines link states and advertises these link states throughout telecommunications network 10. At each layer supported by telecommunications network 10, each node advertises various attributes to neighboring nodes. These link state advertisements are used in performing the route calculations using Dijkstra's algorithm or other route determination techniques.

Figure 3:
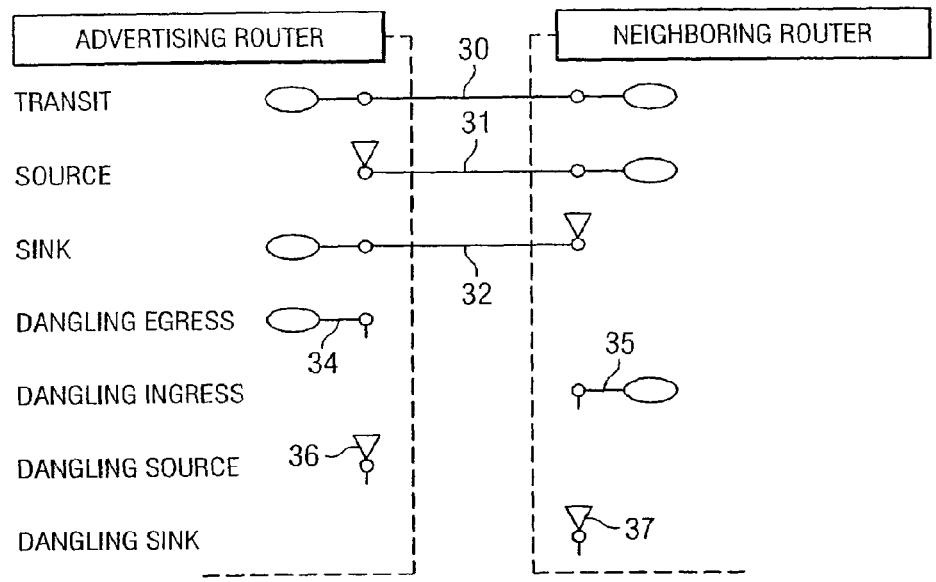
FIG. 3 illustrates connection type attributes determined and advertised at each node in the telecommunications network.

FIG. 3 shows connection type attributes that may be supported by a node and advertised to a neighboring node. These connection type attributes add efficiency and flexibility to route calculations not available with conventional attribute advertisements. Connection type attributes include Transit 30, Source 31, Sink 32, Dangling Egress 34, Dangling Ingress 35, Dangling Source 36, and Dangling Sink 37. Connection type Transit 30 represents an ability of the advertising and neighbor node to receive transport network signals from a node and forward the transport network signals to the next node in the route. Connection type Source 31 represents an ability of the advertising node to originate transport network signals at the current layer and an ability for a neighbor node to forward the transport network signals to the next node in the route. Connection type Sink 32 represents the ability of the advertising node to forward the transport network signals to the neighbor node for termination. Connection type Dangling Egress 34 represents the ability of the advertising node to adapt transport network signals from the current connection routing layer to a server connection routing layer. Connection type Dangling Ingress 35 represents an ability of a neighbor node to receive transport network signals at the current connection routing layer from a server connection routing layer. Connection type Dangling Source 36 represents an ability of an advertising node to originate transport network signals at the current connection routing layer and adapt the originating transport network signals to a server connection routing layer. Connection type Dangling Sink 37 represents an ability of a neighbor node to receive transport network signals at the current connection routing layer from a server connection routing layer and terminate the current transport network signals.

At physical medium layers, dangling relationships are not possible since the medium is assumed to be connected to the neighbor node and physical media are not subject to adaptation to other server layers. At physical signal layers, it is possible that equipment inserted into the physical link between nodes has properties that are more restrictive than the switching equipment at the ends of the link. For example, two transparent cross-connects may be connected by a fiber span that includes a SONET repeater. This would limit the link to SONET clients while the switching equipment does not have this limitation. In this case, the limiting properties of the span may be projected into the switches in a way that accurately indicates the type of connectivity available. The limitation is adopted by the nodes as a characteristic of the advertised link though the switching equipment themselves are not the source of the limitation.

FIGS. 4A-C show an example of an advertisement performed by a node 12 according to the present invention. In FIG. 4A, the attributes unreserved bandwidth and maximum LSP bandwidth are shown. These attributes may be advertised once per link. The conventional attribute maximum or total reservable bandwidth is not needed since oversubscription may be handled by simply adjusting the unreserved bandwidth attribute by an appropriate fraction of the bandwidth reservation for each link state protocol assigned to the link.

FIG. 4B shows a connectivity attribute group (CAG) which may be advertised as needed. The CAG includes the signal type, the connection types supported and available, server signal type availability and associated adaptation cost, client signal type availability and associated adaptation cost, and server endpoint affinity. Each node determines the neighbor nodes with which it communicates during an identification phase of operation. A capability exchange phase is then performed so that a node can learn the various capabilities of each of its neighbor nodes. With this information, a node can build CAGs for each link with each neighbor node. Alternatively, these phases may be provisioned at node installation.

A CAG is formed and advertised for each signal type supported by the node. The signal type identifies the layer for this link being advertised. The connection type identifies one or more of the connection types shown in FIG. 3. The server signal type availability indicates that the node has the capability to adapt the current signal type to an identified server layer and that source connectivity is available at that server layer on this link. The adaptation cost identifies the cost involved in extending the dangling egress connectivity in order to traverse to the identified server layer. The client signal type availability indicates that the neighbor node has the capability to adapt the current signal type to an identified client layer and that dangling connectivity is available at the identified client layer on this link. The adaptation cost identifies the cost involved in extending the sink connectivity in order to traverse to the identified client layer. The server affinity endpoint field identifies a list of router identifiers that indicate which nodes should have preferential treatment for termination of a server trail that originates at this node while routing this signal type.

The connection types and associated availability are shown as bit fields with one bit position for each connectivity type defined above. These fields indicate whether each connectivity is supported and currently available for this link. Though shown in this manner, the link state advertisement may take on any form as desired for the communication of this information. If a connection type is advertised as currently available for a link, this indicates that at least one link connection of that type is available. To support setup of multiple co-routed connections, the advertised information could be extended to include the number of available connections of each type. However, the benefit of this extension may not be worth the resulting increase in database size as crankback may be used to address the relatively rare cases in which the advertised information is not sufficient to guarantee that the calculated route is acceptable.

FIG. 4C shows additional attributes that may be advertised for each link. These attributes may be repeated as needed before the CAG to which they apply. These attributes include resource class/color, link protection type, and shared risk link group. These attributes relate to various routing constraints. If they are not included, the default values apply. Any of these attributes may be individually repeated with a new value in order to set that value for the CAGs that follow.

Figure 5A:
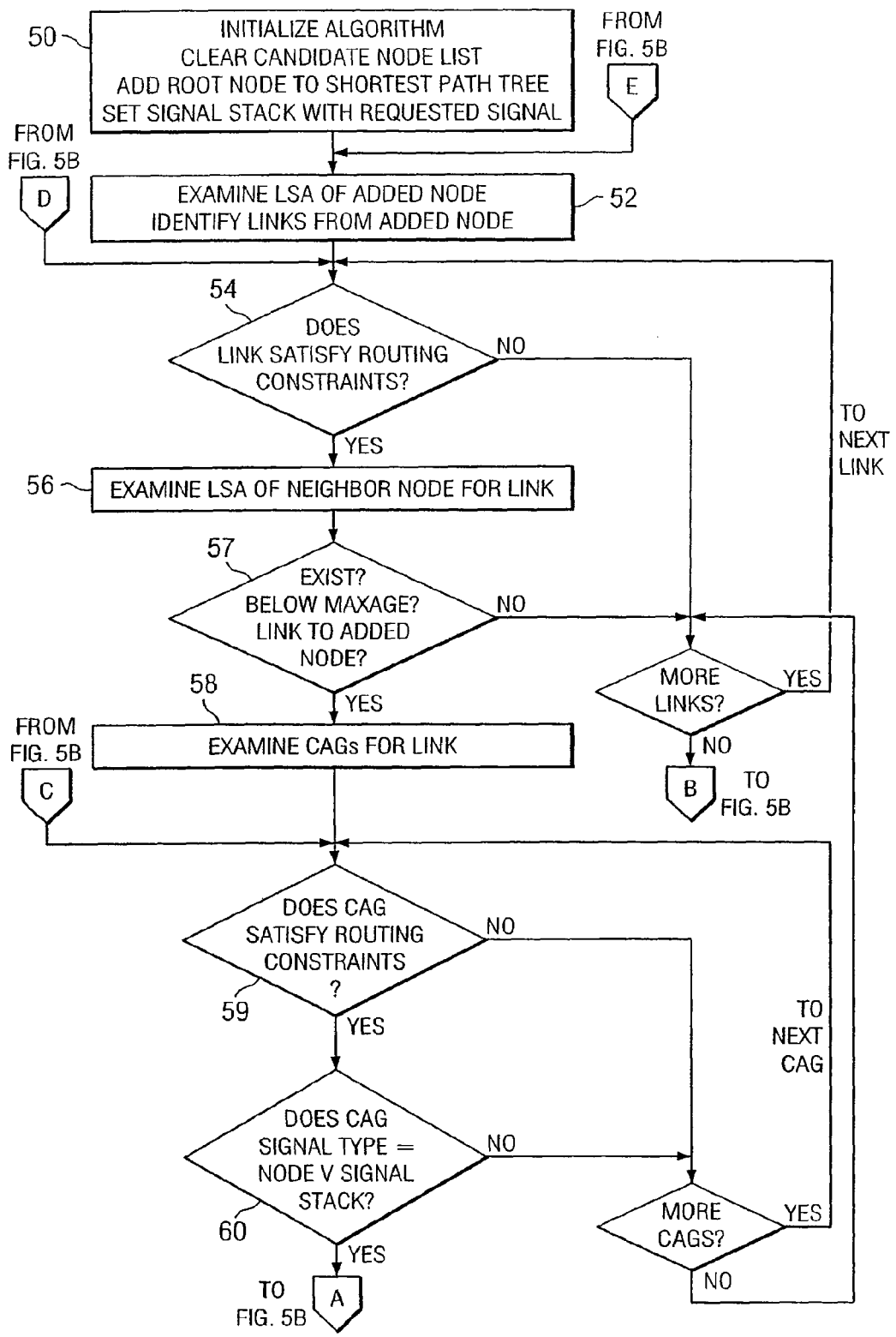
FIGS. 5A-B illustrate a process flow for generating a route calculation implementing the connection type attributes.
Figure 5B:
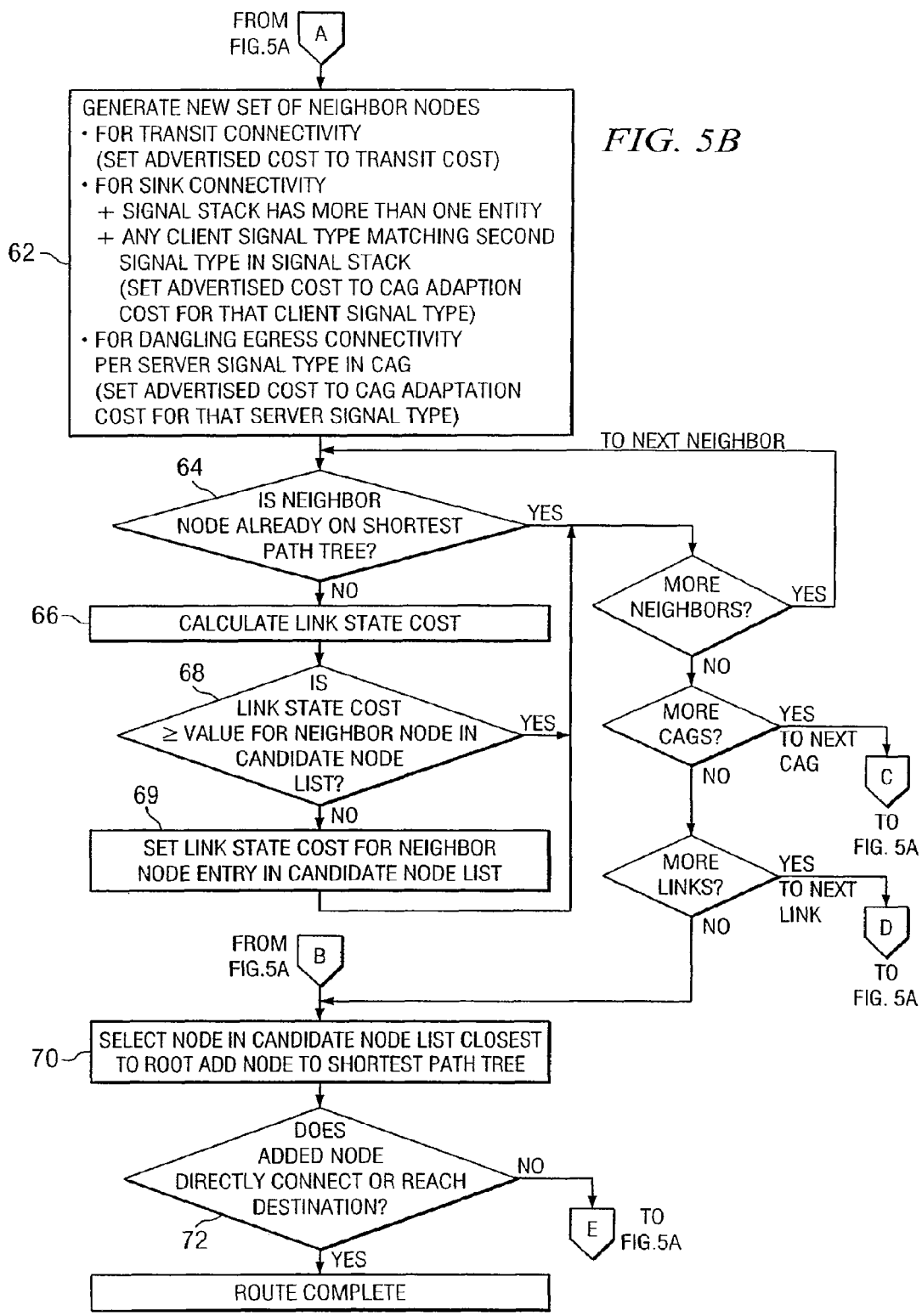

FIGS. 5A-B show an example process in determining a route calculation using the advertised CAG information. The process shows how Dijkstra's algorithm is changed to utilize the CAG information to accomplish route extension via multiplexed and mapped server trails. Though changes to Dijkstra's algorithm are shown, such changes are shown for example purposes only as the advertised CAG information may be implemented in other link state based route determination techniques and not limited to application to Dijkstra's algorithm. In the process shown, each node has an associated node identifier and a signal stack to uniquely identify the node. The signal stack is a stack of signal types that represent the current layers for the connection being routed at this node. As with all stacks, new values are added or pushed on the top of the stack and values are removed or popped from the top of the stack.

The calculation performed by the process of FIGS. 5A-B yields a set of intra-area routes associated with an area, Area A. A shortest path tree is determined by a node calculating the route using a specified node in the network topology as a root. The formation of the shortest path tree is performed in two stages. In the first stage, only links between nodes in a single client layer are considered. In the second stage, links within one or more server layers are considered. At each iteration of the algorithm, there is a list of candidate nodes. Paths from the root to these candidate nodes have been determined but the shortest paths have yet to be defined. Paths to the candidate node that is closest to the root are guaranteed to be shortest. A path is said to be shorter if it has a smaller link state cost. The link state cost of a path is the sum of the costs of the path's constituent links as they exist in a layer network (i.e., CAG). Upon identification, a candidate node is added to the shortest path tree and removed from the candidate node list. Nodes adjacent to the candidate node added to the shortest path tree are examined for possible addition to the candidate node list and the shortest path tree. The algorithm continues to reiterate until the candidate node list is empty.

In FIGS. 5A-B, process flow begins at block 50 where the data structures of the algorithm are initialized and candidate nodes are cleared. A shortest path tree is initialized by adding first a node, for example node V, representing the root with a signal stack containing the signal requested to be routed. Subsequently, the shortest path tree is updated to include new nodes meeting the desired routing constraints. Area A's Transit Capability is set to False. At block 52, the link state advertisement of node V added to the shortest path tree is examined. Each link described by the link state advertisement provides signal types and costs to neighboring nodes. For each described link beginning at block 54, if the attributes of the link between node V and a neighboring node, for example node W, do not satisfy the routing constraints requested, the examined link is skipped and the next link is examined. If routing constraints are satisfied, process flow proceeds to block 56 where node W's link state advertisement is examined. At block 57, if the link state advertisement for node W does not exist, has reached a maximum age, or does not include a link back to node V, then the next link in Node V's link state advertisement is analyzed. Otherwise, process flow proceeds to block 58 for an analysis of each CAG in the link. At block 59, if the attributes of the CAG do not satisfy the routing constraints, the next CAG in the link is analyzed. If routing constraints are satisfied here, process flow proceeds to block 60 where the signal type of the CAG is compared to the top of node V's signal stack. If there is no match, the next CAG in the link is examined.

Upon a match of a signal type, process flow proceeds to block 62 where the connection types of the CAG are examined in order to generate new candidate nodes. If transit connectivity is available, an instance of node W is formed with the current signal stack to specify uniqueness from one instance of node W to another. The advertised cost of each instance is set to the transit cost for the CAG. If sink connectivity is available, the signal stack for node V has more than one entry, and any client signal type of the CAG matches the second signal type in the signal stack of node V, an instance of node W is formed for sink connectivity with the current signal stack excluding the top element of the signal stack for uniqueness and the advertised cost is set to the CAG adaptation cost for that client signal type. If dangling egress connectivity is available, an instance of node W is formed with the current signal stack for dangling egress and for each server signal type in the CAG. The advertised cost is set to the CAG adaptation cost for each server signal type. For each instance of node W generated, process flow proceeds to block 64 to determine if the newly generated instance of node W is already on the shortest path tree. If so, move on to the next generated instance of node W. If not, process flow proceeds to block 66 where the link state cost for the path from the root to node W is calculated. The link state cost is the sum of the link state cost of the shortest path to node V and the advertised cost. At block 68, if the link state cost is greater than or equal to the value that already appears for node W in the candidate node list, then the next CAG is examined. If the link state cost is less than the value that appears for node W on the candidate node list or if node W does not yet appear on the candidate node list, then an entry in the candidate node list for node W is set to the calculated link state cost at block 69 and the next generated node W is examined.

Once all generated node W's for each CAG for each link have been examined, process flow proceeds to block 70 where a node in the candidate node list that is closest to the root is chosen and added to the shortest path tree. At block 72, if the node added to the shortest path tree has a link state advertisement indicating that the destination is directly connected or reachable and the signal stack for the added node contains one entry equal to the destination signal requested, then the calculation of the route is complete. The route is obtained by tracing back from this added node to the root of the shortest path tree. If the route is not complete, process flow returns to block 52 to examine the link state advertisement for the newly added node.

When determining a route of a sub-network connection for a signal through a network, it is desirable to traverse from a client layer, where the signal originates, to a server layer and return. However, while the destination node may be accessible through both client and server layers, the destination node may not support the adaptation function needed to support the client signal on all of its interfaces at the server layer. As a result, the route calculation develops a path that uses an adaptation function to return the connection to the originating layer of the signal prior to completing the route. This behavior is supported through the sink connection type. Since the sink connection type has an associated signal type, it is possible to require the sink connection type match the type of signal being routed. In the case where a particular client signal type is not supported on an interface, the constraint matching function will invalidate the sink connection as a candidate for completing the signal routing. The route calculation will then continue to evaluate other candidates. This behavior is also preferable when the destination node for which a route is being calculated is not the terminating node but a border node which connects this route calculation domain to another domain. A link can be identified as being a border by looking at the advertisement type found in the supporting routing protocol.

When determining the route of a signal through telecommunications network 10, adaptation functions advertised on a link become candidates for extending that route through a server layer. This candidate will be evaluated along with other candidates that are within the same layer as the signal being routed. The cost of the adaptation function, or adaptation cost, becomes a determining factor as to when a server layer connection will be necessary to complete the route for the signal. There may be times where it is desirable to control the points at which server layer extension will be allowed in route calculation. This does not change the fact that an adaptation function exists and it is not removed from the advertisement described above. Instead, a special adaptation cost, such as 0xffff, can be used to denote that route extension through a server layer is prohibited for the signal.

Figure 6:
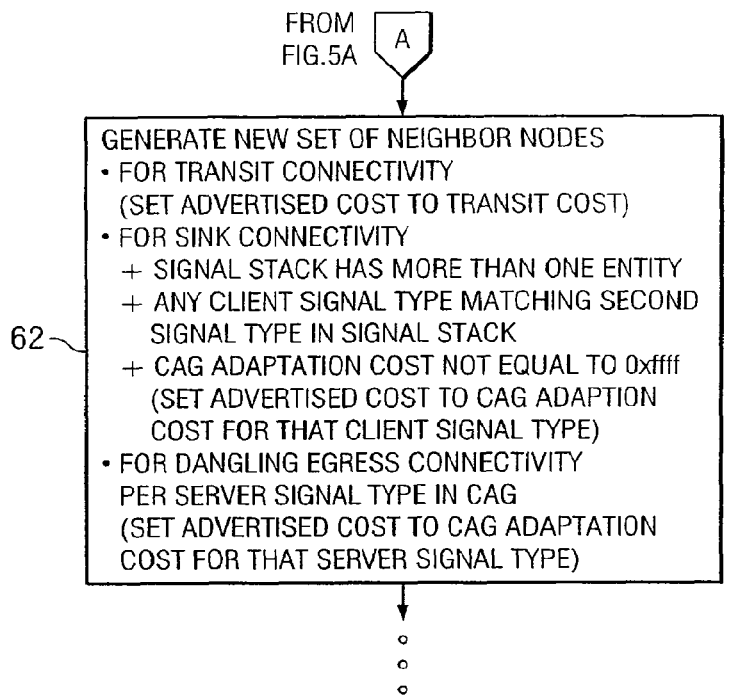
FIG. 6 illustrates an additional step involved in the generation of candidate nodes performed during the route calculation.

FIG. 6 shows the change in the process of FIGS. 5A-B to implement this special adaptation cost. Since the adaptation cost is listed as part of the CAG associated with traversing a signal from a client layer to a server layer, the review of the adaptation cost occurs at the time that the adaptation is pushed onto the signal path. The availability of the adaptation also is checked when traversing from the server layer back to the client layer. Consequently, the return from server layer to client layer imposes a reverse check on the availability of the client layer to server layer adaptation function. If the reverse check fails during the route calculation, then the return to the client layer cannot be accomplished at this point and a new candidate will then be evaluated. The check for the special adaptation cost occurs during the generation of new candidate nodes. During the check for availability of a sink or dangling egress availability, if the adaptation cost has the special adaptation cost value, in this case 0xffff, then a candidate node is not generated. If the adaptation cost is not the special adaptation cost value, then a candidate node is added to the candidate node list.

Figure 7:
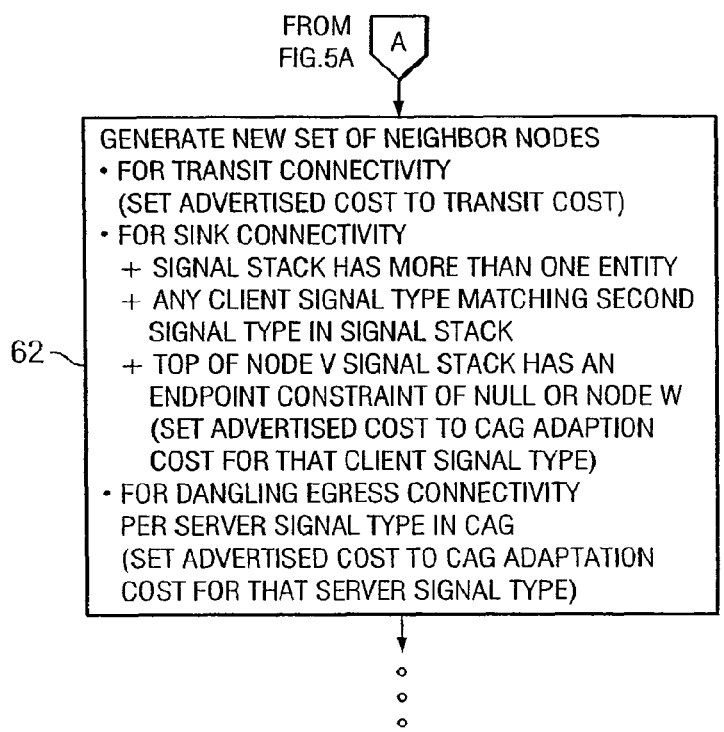
FIG. 7 illustrates an additional step involved in the generation of candidate nodes during the route calculation.

FIG. 7 shows an example change to the process of FIGS. 5A-B implementing an affinity cost adjustment for route extensions via multiplexed server trails. When extending a route through a dangling egress followed by a server layer source connection, a special candidate route is created that has an added endpoint constraint that it must reach a matching server layer sink connection at a node that is already a neighbor of the current node for the link containing transit connections at the client layer being routed. This special candidate route has its cost adjusted by reducing or eliminating the adaptation cost for the server layer. The endpoint constraint is applied to this route candidate, and any route candidates that are generated from it, as the route calculation proceeds. The endpoint constraint for the special candidate route is determined by identifying all the neighbors of the current node on links that support transit connection types at the layer being routed regardless of whether or not these links currently have transit connections available. For the sink connectivity check of block 62, the added limitation on generating a node W is that the top of the signal stack for node V has either a NULL endpoint constraint or the endpoint constraint includes node W. For the dangling egress connectivity check, a node W is generated with both an endpoint constraint and a NULL endpoint constraint. The advertised cost for the first generated node W is set to the CAG transit cost and the advertised cost for the second generated node W is set to the CAG adaptation cost. The endpoint constraint is a list of affinity endpoints that can be used to terminate the server layer trail and achieve the costs associated with the path to node V. Any signal in the signal stack, except the bottom signal, can be associated with a unique endpoint constraint. This method could be extended to create special candidate routes with different cost discounts depending on the number and size of existing trunks to each current neighbor node.

Figure 8:
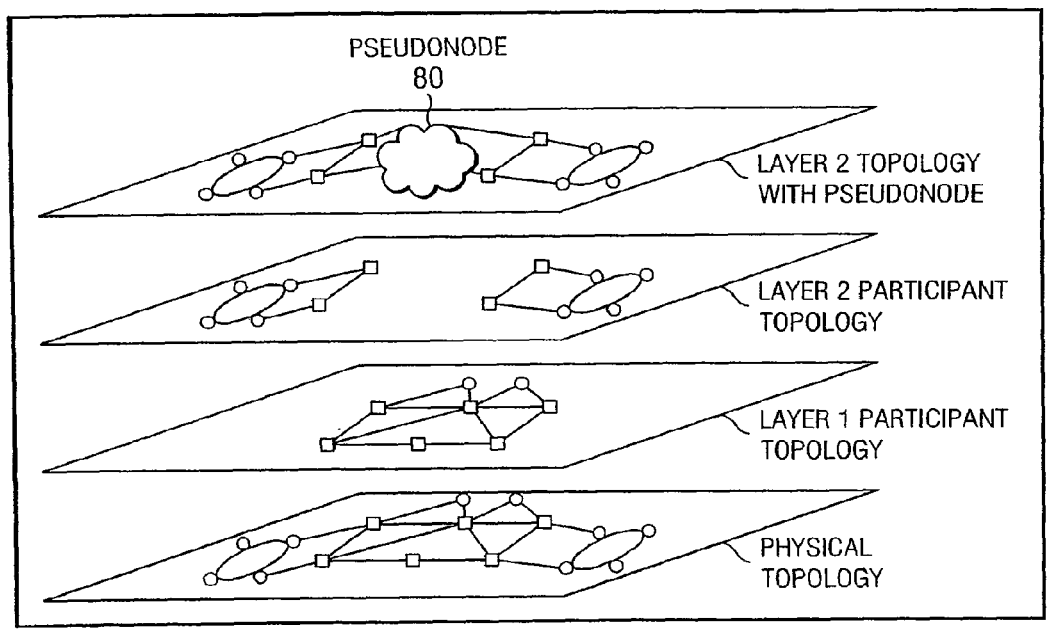
FIG. 8 illustrates a layer isolated connection routing approach to a multi-layer network.

FIG. 8 shows the implementation of layer isolated connection routing in a multi-layer network. Through the effective advertisement and route calculation described above, effective multi-layer network routing can be achieved. However, there may situations where it may be beneficial to provide layer isolated connection routing in a multi-layer network. A main limitation of layer isolated connection routing discussed above is the inability to take into consideration potential connectivity that can be supplied by server layer connections through links to the client layer in which the signal is to be routed. This limitation can be eliminated by assigning a node identifier to a fictitious node, or pseudo node 80, that serves to represent the potential connectivity provided by a server layer between switching equipment operating at the client layer.

Typically, a node identifier is assigned to a network node. The node identifier serves to correlate all the links advertised relative to that node as having a common switching point through which signals can be routed. In multi-layer networks, there may be resources that could be used to create additional connectivity or new links between nodes by creating new trails in a server layer of the network. However, it would be inefficient to advertise all possible new links due to the vast number of possibilities. Instead, the potential connectivity provided by a server layer can be effectively summarized through the pseudo node. The pseudo node provides the possibility that any node at the edge of the server layer may be connected to any other node. The pseudo node represents the potential server layer connectivity in support of the client layer without the need to show the details of the server layer connectivity.

For each client layer node connected to a server layer, one or more links would be included in the link state database to represent this connectivity. These links would be included in the link state advertisement of the node in the client layer. Route calculations could then take into account the possibility of creating new paths in the server layer by traversing links to and from the pseudo node. The cost of these links can be set according to the desired policy regarding the preference that should be given to using existing links in the client layer versus the newly created links to the pseudo node using the server layer.

Advertisement of links from the pseudo node must also be made. Generally each node in the network advertises its outgoing links. However, the pseudo node is fictitious. To overcome this, the content of a link advertisement may be independent from its source. In distributed flooding protocols, the neighbor node from whom a node receives a link advertisement is often not the node originating that link advertisement. By exploiting this feature of flooding protocols, a client layer node is allowed to advertise a link from itself to the pseudo node and also advertise the corresponding link from the pseudo node to itself. This advertisement is created as if it was generated by the pseudo node and then flooded throughout the network as any other link advertisement. This allows distributed network implementations to employ pseudo nodes without the added complexity of creating a separate pseudo node routing protocol entity.

Though pseudo nodes have been used in the past, the present invention is able to apply pseudo nodes technique to multi-layer transport networks. Pseudo node information being advertised does not require designated router election and other coordination between proxy advertisers. The use of pseudo nodes in a multi-layer network provides the ability to control, via provisioning, the communities connected to a given pseudo node to effect routing policies. Also, an ability is provided for nodes advertising connection to a pseudo node to recognize the pseudo node in routes and request a connection through the core network to replace pseudo node hops in the route.

In summary, effective multi-layer network routing can be performed through advertisement of appropriate link state information and through the use of the link state information during route calculation. The link state information includes connection type attributes that specify not only how a node can transport information in a layer and between layers of a network but also identify optimal points to move between layers and what nodes provide access to a desired layer of the network. Multi-layer network routing may also be represented in a layer isolated connection routing approach through the use of pseudo nodes.

The techniques performed by the present invention may be implemented in software to be executed by a computer, hardware, or a combination of both. For example, each node may have individual modules that can identify the different signal types and connection routing layers associated with the node, determine the connection types and availabilities corresponding to each connection routing layer at the node, and broadcast the link state advertisement, either in separate modules or different functions may be combined into the same module. Modules may also be provided to calculate a route through the network and determine the various transit and adaptation costs associated with connections in the network. These modules may provide the structure within the network for performing the functionality of the present invention.

Although the present invention has been described in detail with reference to particular embodiments, it should be understood that various other changes, substitutions, and alterations may be made hereto without departing from the spirit and scope of the present invention. For example, although the present invention has been described with reference to Dijkstra's algorithm, other routing calculations may be used with equal effectiveness in the present invention. Moreover, a number of potentially suitable components that facilitate the processing of information in various types of formats, any suitable objects, elements, hardware, or software may be used in the applications or operations described above. The arrangements described above in conjunction with telecommunications system 10 provide only an example configuration used for purposes of teaching and substitutions and modifications may be made where appropriate and according to particular needs.

Other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A computer-implemented method for routing in a network, the method comprising:
    establishing a pseudo node that represents potential connectivity provided by a server layer among nodes in a client layer of a multi-layer network;
    creating one or more link state advertisements at a first node in the client layer as if the one or more link state advertisements were generated by the pseudo node itself, the one or more link state advertisements including information about a link between the first node and the pseudo node;
    transmitting the one or more link state advertisements from the first node in the client layer to at least one other node in the client layer; and
    enabling one or more connections among two or more nodes in the client layer via the pseudo node.

2. The method of claim 1, wherein enabling the one or more connections among the two or more nodes in the client layer via the pseudo node includes enabling the one or more connections among the two or more nodes that cannot otherwise be connected to each other in the client layer.

3. The method of claim 1 further including:
    assigning a node identifier to the pseudo node, the node identifier serving to correlate all the links advertised relative to the pseudo node as having a common switching point through which signals can be routed.

4. The method of claim 1, wherein creating the one or more link state advertisements includes omitting details of connectivity of the server layer.

5. The method of claim 1, wherein transmitting the one or more link state advertisements involves using distributed flooding protocols.

6. The method of claim 1, wherein transmitting the one or more link state advertisements includes providing information about connectivity among the two or more nodes in the client layer without providing details of connectivity of the server layer to the two or more nodes in the client layer.

7. The method of claim 1 further including:
    calculating a route from the first node to a second node via the pseudo node.

8. The method of claim 1 further including:
    routing a signal from the first node to a second node in the client layer via the pseudo node, the second node being isolated from the first node in the client layer.

9. The method of claim 1 further including:
    establishing the server layer and the client layer in the multi-layer network, the server layer providing trunk capability for the client layer.

10. The method of claim 1, wherein the server layer is unaware of connectivity available within the client layer and the client layer is unaware of connectivity available within the server layer.

11. A non-transitory computer readable medium including code for determining a route calculation in a multi-layer network, the code to be executed by a computer operable to:
    establish a pseudo node that represents potential connectivity provided by a server layer among nodes in a client layer of a multi-layer network;
    create one or more link state advertisements at a first node in the client layer as if the one or more link state advertisements were generated by the pseudo node itself, the one or more link state advertisements including information about a link between the first node and the pseudo node;
    transmit the one or more link state advertisements from the first node in the client layer to at least one other node in the client layer; and
    enable one or more connections among two or more nodes in the client layer via the pseudo node.

12. The computer readable medium of claim 11, wherein the code is further operable to:
    enable the one or more connections among the two or more nodes in the client layer via the pseudo node by enabling the one or more connections among the two or more nodes that cannot otherwise be connected to each other in the client layer.

13. The computer readable medium of claim 11, wherein the code is further operable to:
    assign a node identifier to the pseudo node, the node identifier serving to correlate all the links advertised relative to the pseudo node as having a common switching point through which signals can be routed.

14. The computer readable medium of claim 11, wherein the code is further operable to:
    omit details of connectivity of the server layer from the one or more link state advertisements.

15. The computer readable medium of claim 11, wherein the code is further operable to:
    use distributed flooding protocols to transmit the one or more link state advertisements.

16. The computer readable medium of claim 11, wherein the code is further operable to:
    provide information about connectivity among the two or more nodes in the client layer without providing details of connectivity of the server layer to the two or more nodes in the client layer.

17. The computer readable medium of claim 11, wherein the code is further operable to:
  calculate a route from the first node to a second node via the pseudo node.

18. The computer readable medium of claim 11, wherein the code is further operable to:
  route a signal from the first node to a second node in the client layer via the pseudo node, the second node being isolated from the first node in the client layer.

19. The computer readable medium of claim 11, wherein the code is further operable to:
  establish the server layer and the client layer in the multi-layer network, the server layer providing trunk capability for the client layer.

20. The computer readable medium of claim 11, wherein the server layer is unaware of connectivity available within the client layer and the client layer is unaware of connectivity available within the server layer.

21. A system for routing in a network, the system comprising:
  means for establishing a pseudo node that represents potential connectivity provided by a server layer among nodes in a client layer of a multi-layer network;
  means for creating one or more link state advertisements at a first node in the client layer as if the one or more link state advertisements were generated by the pseudo node itself, the one or more link state advertisements including information about a link between the first node and the pseudo node;
  means for transmitting the one or more link state advertisements from the first node in the client layer to at least one other node in the client layer; and
  means for enabling one or more connections among two or more nodes in the client layer via the pseudo node.

22. The system of claim 21 further including:
  means for assigning a node identifier to the pseudo node, the node identifier serving to correlate all the links advertised relative to the pseudo node as having a common switching point through which signals can be routed.

23. The system of claim 21 further including:
  means for calculating a route from the first node to a second node via the pseudo node.

24. The system of claim 21 further including:
  means for routing a signal from the first node to a second node in the client layer via the pseudo node, the second node being isolated from the first node in the client layer.

25. The system of claim 21 further including:
  means for establishing the server layer and the client layer in the multi-layer network, the server layer providing trunk capability for the client layer.

26. The method of claim 1, wherein the pseudo node is defined by one or more nodes in the server layer, and the pseudo node is located at a different node in a topology from the nodes in the client layer.

27. The method of claim 1, wherein the pseudo node is defined by a plurality of nodes in the server layer.

28. The method of claim 1, wherein the server layer and the client layer use different signal types.

29. The method of claim 1, wherein transmitting the one or more link state advertisements from the first node in the client layer to the at least one other node in the client layer is achieved through broadcasting.

30. The method of claim 1, wherein enabling the one or more connections among the two or more nodes in the client layer via the pseudo node is achieved through routing between a pair of nodes.

31. A computer-implemented network, comprising:
  a pseudo node, the pseudo node being configured to:
  represent potential connectivity provided by a server layer among nodes in a client layer of a multi-layer network;
  receive one or more link state advertisements created at a first node in the client layer as if the one or more link state advertisements were generated by the pseudo node itself, the one or more link state advertisements including information about a link between the first node and the pseudo node;
  transmit the one or more link state advertisements from the first node in the client layer to at least one other node in the client layer; and
  enable one or more connections among two or more nodes in the client layer.

* * * * *